(12) United States Patent
Christensen et al.

(10) Patent No.: US 7,703,861 B2
(45) Date of Patent: Apr. 27, 2010

(54) BRAKE VALVE ARRANGEMENT

(75) Inventors: Carsten Christensen, Broager (DK); Martin Raadkjaer Joergensen, Soenderborg (DK)

(73) Assignee: Sauer-Danfoss Aps, Nordborg (DK)

( * ) Notice: Subject to any disclaimer, the term of this patent is extended or adjusted under 35 U.S.C. 154(b) by 997 days.

(21) Appl. No.: 11/334,905

(22) Filed: Jan. 18, 2006

(65) Prior Publication Data
US 2006/0158025 A1 Jul. 20, 2006

(30) Foreign Application Priority Data
Jan. 19, 2005 (DE) .................. 10 2005 002 699

(51) Int. Cl.
*B60T 8/40* (2006.01)

(52) U.S. Cl. .............. 303/116.1; 303/DIG. 10; 303/123; 303/9.62; 303/119.1

(58) Field of Classification Search .......... 303/3, 303/123, 9.62, 9.69, 15, 121, 124, 125, 155, 303/DIG. 10, 113.4, 113.5, 116.1, 116.2, 303/119.1, 119.3, 20, 22.1, 22.2
See application file for complete search history.

(56) References Cited

U.S. PATENT DOCUMENTS

| 3,836,205 | A | * | 9/1974 | Schwerin | ............. 303/7 |
|---|---|---|---|---|---|
| 4,006,939 | A | * | 2/1977 | Schexnayder | ............. 303/71 |
| 5,429,425 | A | * | 7/1995 | Drott | ............. 303/3 |
| 5,549,364 | A | * | 8/1996 | Mayr-Frohlich et al. | ... 303/9.69 |
| 5,626,402 | A | | 5/1997 | Saffran | ............. 303/7 |
| 6,234,584 | B1 | | 5/2001 | Stumpe et al. | ............. 303/7 |
| 6,666,527 | B2 | | 12/2003 | Gill et al. | ............. 303/7 |
| 6,907,728 | B2 | * | 6/2005 | Cazier et al. | ............. 60/430 |

FOREIGN PATENT DOCUMENTS

DE 195 14 733 A1 10/1996
DE 198 55 679 A1 2/2000

OTHER PUBLICATIONS

Brochure Rexroth Bosch Group entitled "Hydraulic trailer brake valve"; 23 pages.

* cited by examiner

*Primary Examiner*—Melanie Torres
(74) *Attorney, Agent, or Firm*—McCormick, Paulding & Huber LLP

(57) ABSTRACT

The invention concerns a brake valve arrangement of a vehicle having a trailer coupling and at least one controllable hydraulic consumer, with a brake valve (27). It is endeavored to provide a similar embodiment of a vehicle with such a brake valve arrangement. For this purpose, the brake valve (27) is combined with at least one control valve (11, 12) controlling the hydraulic consumer into forming a valve block (10) having several valve modules.

19 Claims, 5 Drawing Sheets

BRAKE VALVE ARRANGEMENT

CROSS-REFERENCE TO RELATED APPLICATIONS

Applicant hereby claims foreign priority benefits under U.S.C. §119 from German Patent Application No. 10 2005 002 699.0 filed on Jan. 19, 2005, the contents of which are incorporated by reference herein.

FIELD OF THE INVENTION

The invention concerns a brake valve arrangement of a vehicle having a trailer coupling and at least one controllable hydraulic consumer, with a brake valve.

BACKGROUND OF THE INVENTION

Such a brake valve is, for example, known from DE 195 14 733 B4. The purpose of the brake valve is to brake a trailer coupled with an agricultural utility vehicle, for example a tractor, via the tractor. In this connection, the brake valve is supplied via a pump. Between the brake valve and the pump is located a control device, through which hydraulic fluid can be supplied to either the brake valve or another consumer. The exact design of such a brake valve appears from the company brochure "Hydraulisches Anhänger-Bremsventil (Hydraulic trailer brake valve)", code number 1 987 760 506/11.99 of the company Bosch Rexroth AG, 71701 Schwieberdingen, Germany.

It is true that such a brake valve is particularly appropriate with trailers having a high weight. However, the cost of such an additional brake valve is not insignificant. Also, additional pipes, connections and sealings must be provided.

BRIEF SUMMARY OF THE INVENTION

The invention is based on the task of providing a simple design of a vehicle with such a brake valve.

With a brake valve arrangement as mentioned in the introduction, this task is solved in that together with at least one control valve controlling the hydraulic consumer the brake valve forms a valve block having several valve modules.

With a relatively small construction effort, this embodiment provides the additional function of a brake valve, with which the trailer connected via the trailer coupling can be reliably hydraulically braked. In many tractors and other agricultural vehicles hydraulic functions have already been integrated. Usually even the simplest tractor has on its rear end a hydraulic lifting device, the so-called "tool-bar", on which attachments can be fixed, for example a plough or a harrow. A control valve is already available for controlling this hydraulic function. When now, the brake valve is flanged onto this control valve, firstly only relatively little additional space will be required. Usually, an additional space corresponding to the thickness of the control valve will be sufficient. Additional mounting means require practically no space, as the brake valve is simply flanged onto the control valve. In many cases, the bolts merely have to be somewhat longer. The fact that the brake valve is flanged onto the control valve (or several control valves) makes one single pressure pipe sufficient, which is led to the valve block. Additionally, auxiliary functions can be integrated in the valve block, like priority valves or pressure limiting valves. Such auxiliary functions are often also required for other hydraulic consumers, so that for the brake valve they do not have to be provided separately.

Preferably, the brake valve can be controlled by an electrical signal. Thus, the trailer brake can be made as "brake by wire", that is, merely an electrical signal, not, however a mechanical signal, is required to make the trailer brake. Firstly, this facilitates the control of the brake valve. Secondly, as will be explained later, this involves a number of additional opportunities.

Preferably, the electrical signal can be generated by a pressure sensor, which is coupled with a hydraulic brake system of the vehicle. The hydraulic brake system activates the wheel brakes of the vehicle, when the driver activates a corresponding actuation device, for example a brake pedal. The pressure in the hydraulic system is a measure for, how much the driver wishes to brake the vehicle. Accordingly, this pressure can be used as a measure for, how much the trailer shall be braked. Accordingly, a pressure dependent electrical signal is to a high degree suited for the control of the trailer brake.

It is particularly preferred that a trailer brake pressure sensor is located at the outlet of the brake valve. The trailer brake can then be used in a closed control circuit in such a manner that the brake pressure in the trailer corresponds to the brake pressure in the vehicle. This correspondence does not necessarily mean that the pressure values in the hydraulic brake system of the vehicle and in the hydraulic brake system of the trailer are the same. For example, it is sufficient, when the effects of the two hydraulic pressures are the same, so that the trailer is decelerated to a similar degree as the vehicle.

Alternatively or additionally, it may be ensured that the electrical signal is generated by an advance working control device. In some cases, tractors are provided with some kind of automatic gear. Either a speed control pedal or a hand lever, a so-called joystick, is used for the advance working. When the speed control pedal is pushed right down or the control lever is pushed forward, for example, the vehicle accelerates. When the speed control pedal is released or the control lever is taken back, the vehicle must decelerate. The latter change of the position of the control element in question can also be used for generating the electrical signal. When the vehicle is to decelerate, it is expedient to brake the trailer.

Preferably, the electrical signal can be generated by an overrunning sensor. An overrunning sensor can, for example, be a power sensor located in the area of the coupling between the vehicle and the trailer. When the vehicle decelerates, the trailer exerts an increased force on the vehicle, which can be detected by the overrunning sensor. Depending on the size of the force, the brake valve can be controlled so that the trailer is braked to a suitable extent. In principle, such an overrunning sensor forms a mechanically working overrunning brake.

Preferably, the electrical signal can be changed by an auxiliary device. With the auxiliary device, the brake signal can be adapted to different trailers or to different operating states of the trailer. For example, a fully loaded trailer, which accordingly has an increased mass, requires a braking power, which is different from that of an empty trailer. If an empty trailer as acted upon by the same braking power, the risk exists that the wheels would be blocked and the driving behaviour would be uncontrollable. On the other hand, if a fully loaded trailer was braked like an empty trailer, the deceleration achieved would probably be too small.

Preferably, the auxiliary device has at least one of the following elements:
  a manual setting device;
  a trailer load sensor;
  a pull load sensor;
  a motor load sensor;
  an overrunning sensor.

With the manual setting device a manual setting can be made, whereas the remaining elements are automatic. The setting device can, for example, be a simple potentiometer, with which an ohmic resistance can be adjusted. A trailer load sensor can, for example, be a pressure or power sensor, which determines the load state of the trailer. A pull load sensor provides information about the power required to make the trailer move. Similar information reaches the brake valve via the motor load sensor. A loaded and thus heavier trailer causes a motor load, which is different from that of a light or empty trailer. Particularly when using CAN-busses, which have already been implemented in many vehicles, the information about the motor load can easily be integrated in the control of the brake valve.

Preferably, the overrunning sensor is connected with a memory device. When the vehicle is braked for the first time, the signal from the overrunning sensor permits derivation of information about the brake power required by the trailer. This brake power can then be stored in the memory device. It can be updated during each braking process. In this case, the overrunning sensor cannot only be used for the modified overrunning brake, but also for an improved adaptation of the braking processes.

Preferably, the brake valve has a valve actuator with a control pressure generation device, which comprises at least two solenoid valves. The control pressure generation device provides a simple manner of converting the electrical signals so that the brake valve can be actuated. Thus, the electrical signals do not generate a force, which acts directly on the brake valve, for example via a magnet, but solenoid valves are actuated, which on their part generate a pilot or control pressure. Such solenoid valves can be relatively small. Accordingly, they also merely require a small electrical supply.

Preferably, the control pressure generation device has three solenoid valves. In this connection, the knowledge is utilised that the brake valve usually only has to generate a pressure in one direction. This is the actuation pressure for the trailer brake. Usually, the brakes are reset by springs. During resetting, the hydraulic fluid is again displaced in the direction of the brake valve. Accordingly, a separate control of the return flow of the hydraulic fluid is not required. Accordingly, three solenoid valves will usually be sufficient.

Preferably, the brake valve has a control slide, which is connected in series with a compensation slide. For example, as will be explained below, the compensation slide can be used for maintaining a predetermined pressure in the neutral position of the control slide. In many countries, it is a provision that the brake of the trailer cannot be released until a certain minimum pressure exists. In Italy, for example, this pressure is in the range from 8 to 18 bar. When the pressure drops below this limit, the brake must engage again. Such a minimum pressure can be achieved in a simple manner by means of the compensation slide.

It is preferred that the control slide can be deflected in two opposite directions, in the neutral position generating a pressure in the range from 8 to 18 bar at the outlet of the brake valve. Thus, the desired function, as mentioned, can be realised. The deflection of the slide in one direction is then used for braking the trailer via an "operation brake" with a pressure increase, which corresponds to the actuation of the brake pedal in a car. The deflection of the control slide in the other direction is used for imitating a "locking and holding brake", which is comparable with the handbrake in a car.

In a modified embodiment, it is ensured that in the neutral position of the control slide, a connection exists from the outlet connection to the tank connection. In this case, the pressure at the outlet connection in the neutral position drops to zero. This is a provision in other countries, for example in France.

BRIEF DESCRIPTION OF THE DRAWINGS

In the following, the invention is described on the basis of preferred embodiments in connection with the drawings, showing.

DETAILED DESCRIPTION OF THE INVENTION

Figure 1:
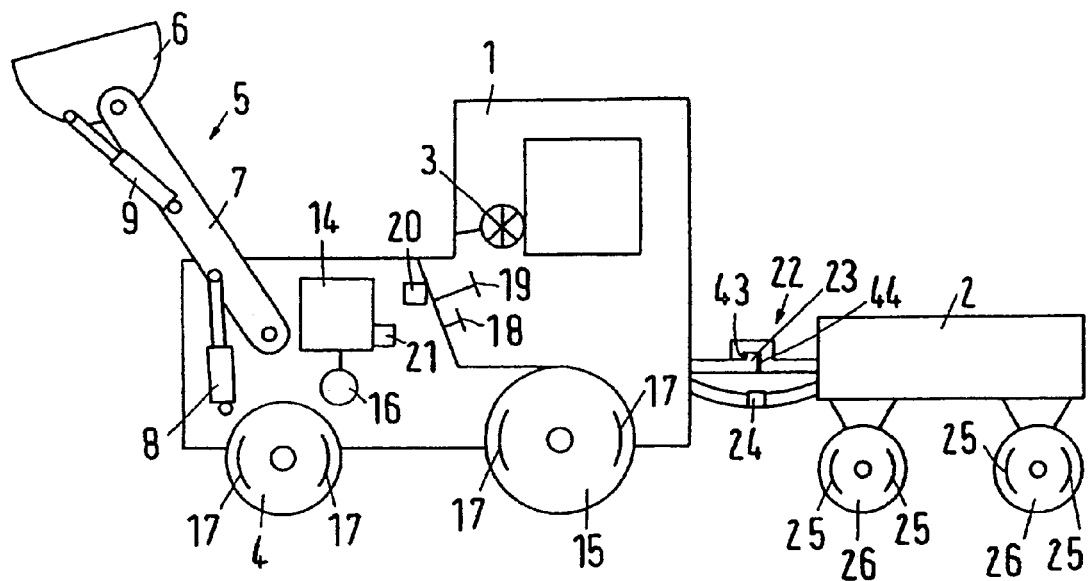
FIG. 1 is a schematic view of a pulling vehicle with a trailer.

In a heavily schematised form, FIG. 1 shows a pulling vehicle 1, which pulls a trailer 2. The pulling vehicle can, for example, be a tractor or another agricultural machine. In a manner known per se, the pulling vehicle has a steering handwheel 3 acting via a hydraulic steering arrangement (not shown in detail) upon steered front wheels 4. Further, the pulling vehicle has a front-end loader mechanism 5, for example a shovel 6, which is fixed to be articulated on an arm 7. The arm 7 is pivotally mounted on the pulling vehicle 1. Via a first hydraulic cylinder 8, the arm 7 can be pivoted in relation to the vehicle 1. Via a second hydraulic cylinder, the shovel 6 can be pivoted in relation to the arm 7.

Figure 2:
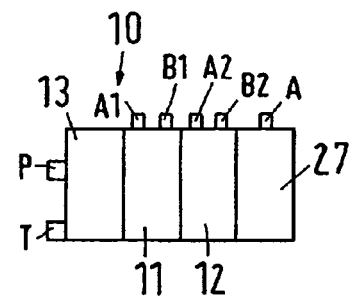
FIG. 2 is a schematic view of a valve block with a brake valve.

For the control of the front-end loader mechanism 5, a valve block 10 (FIG. 2) is provided, which has a first control valve 11 for the first hydraulic cylinder 8 and a second control valve 12 for the second hydraulic cylinder 9. Both control valves 11, 12 are connected in series with a common supply module 13. The supply module has a pump connection P and a tank connection T. Each control valve 11, 12 has working connections A1, B1 or A2, B2, respectively.

The pulling vehicle 1 is provided with an engine 14, for example a diesel engine. The engine 14 drives not only the rear wheels 15, but also a pump 16, which provides the hydraulic pressure for supplying the front-end loader mechanism 5 and the steering unit (not shown in detail). The pump 16 is connected with the pump connection P of the valve block 10.

The pulling vehicle 1 has a hydraulic brake system, of which merely brake pads 17 are shown, which act upon the wheels 4, 15. For actuating the hydraulic brake system is provided a brake pedal 18, whose interaction with further components will be explained by means of FIGS. 3 and 4. Further, in a manner known per se, the pulling vehicle 1 has a speed control pedal 19, which is also called accelerator. Pushing the speed control pedal 19 down, will cause the engine 14 to provide a more powerful driving of the pulling vehicle 1. When the pedal is released, the advance is reduced. The position of the speed control pedal 19 can be determined via a sensor 20. A further sensor 21 is provided for determining the load of the engine 14. Depending on the concrete embodiment of the pulling vehicle 1, the two latter sensors can under certain circumstances be avoided.

The trailer 2 is coupled with the pulling vehicle 1 by means of a coupling arrangement 22. The coupling arrangement 22 has a trailer coupling 23 and a hydraulic coupling 24. The hydraulic coupling 24 makes it possible to transfer pressurised hydraulic fluid from the pulling vehicle 1 to the trailer 2. The purpose of this hydraulic fluid is to activate brake pads 25 in the trailer 2, which act upon the trailer wheels 26.

To enable actuation of the brake pads 25 in the trailer 2, when actuating the brake pedal 18, a brake valve 27 is provided. The brake valve 27 is flanged onto the valve block 10. Therefore, only relatively little extra space is required. Further, the supply of the brake valve 27 can take place via the supply module 13, so that not additional supply pies for the brake valve are required.

Figure 3:
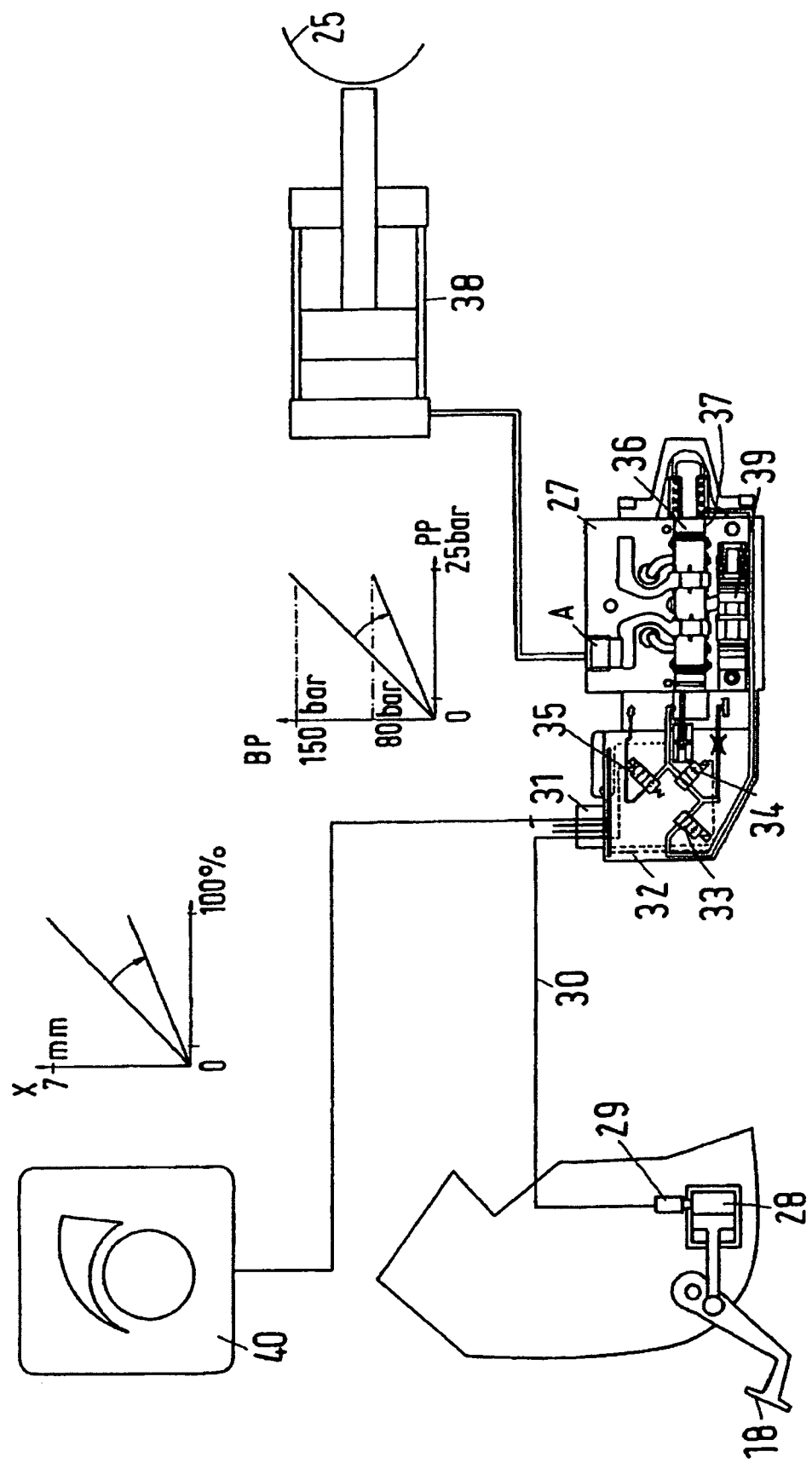
FIG. 3 is a first embodiment of a brake valve arrangement.

The integration of the brake valve 27 in a brake valve arrangement is shown by way of example in FIG. 3.

As can be seen from FIG. 3, the brake pedal 18 acts upon a brake cylinder 28. When pushing the brake pedal 18 down, an increased pressure occurs in the brake cylinder 28, which can be determined by a pressure sensor 29. The pressure sensor 29 converts the pressure to an electrical signal, which is supplied to a control device 31 via a signal line 30. The control device 31 is fixed on a control pressure generation device 32, which again is flanged onto a front side of the brake valve 27. The control pressure generation device 32 has three solenoid valves 33 to 35, which generate a hydraulic pressure difference over a control slide 36, which is located in a bore 37 in the housing of the brake valve 27. The design of such a control pressure generation device 32 and its effect on the control slide 36 are, for example, known from a priority valve PVG of Sauer-Danfoss ApS, Nordborg, Denmark. Therefore, a detailed description will not be given. Thus, the brake valve 27 can be a proportional valve with a relatively simple design.

In dependence of the position of the control slide 36 in the bore 37, a higher or lower pressure reaches the outlet A of the brake valve 27. This outlet A is connected with a wheel brake cylinder 38, whose piston does ultimately act upon the brake pads 25 of the wheels 26 of the trailer 2.

At this point, please note that instead of brake pads 25, of course also other brake means can be used, for example brake blocks of disc brakes.

Figure 5:
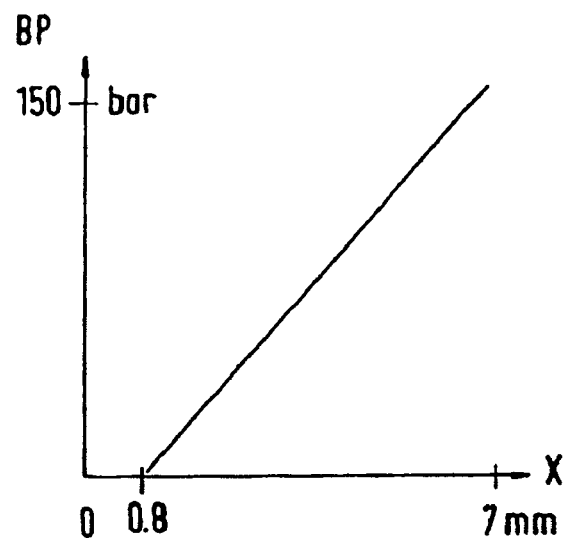
FIG. 5 is a characteristic of a first embodiment.
Figure 6:
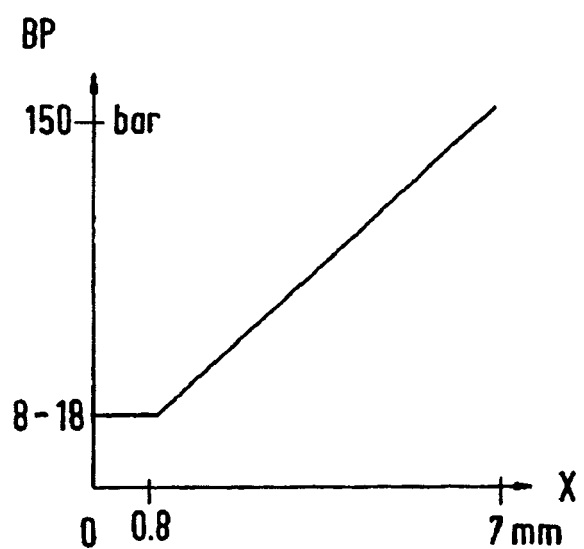
FIG. 6 is a characteristic of a second embodiment.

Connected hydraulically in series with the control slide 36 is a compensation slide 39, whose task will be explained in connection with the FIGS. 5 to 7. In principle, a standard valve housing of a PVG-valve can simply be equipped with a pressure control slide and a compensation slide as described in, for example, DE 102 58 517 B3. The result will be a brake valve. In principle, it is thus possible to take a module from a traditional valve group and use it as a trailer brake valve.

By means of the brake valve 27 and the control device 31, it is now possible to adapt in a simple manner the correlation between the actuation of the brake pedal 18 and the resulting brake effect to different requirements. In the simplest case, a merely schematically shown potentiometer 40 is provided, which is connected with the control device 31. By means of the potentiometer 40 it is possible to change the "transmission ratio", that is, the deflection X of the slide 36 between 0 and, for example, 7 mm in dependence of the "requirement", that is, the travel of the brake pedal 18, between 0 and 100%. This is shown schematically in the sketch next to the potentiometer 40.

By means of the control pressure generation device it is also possible to change the correlation between the pedal pressure PP in the brake cylinder 28 and the brake pressure BP in the brake cylinder 38, as shown schematically in the sketch over the brake pedal 27. When the pedal pressure PP increases from 0 to 25 bar, the brake pressure at the lower limit increases from 0 to 80 bar and at the upper limit to 0 to 150 bar. Thus, it can be anticipated that with a light, for example empty, trailer 2 a lower brake pressure will be required than with a heavy or fully loaded trailer 2. When a light trailer is braked with the full brake pressure, there is a risk that the wheels are blocked. On the other hand, braking a heavy trailer with a too low brake pressure would result in an insufficient deceleration.

Figure 4:
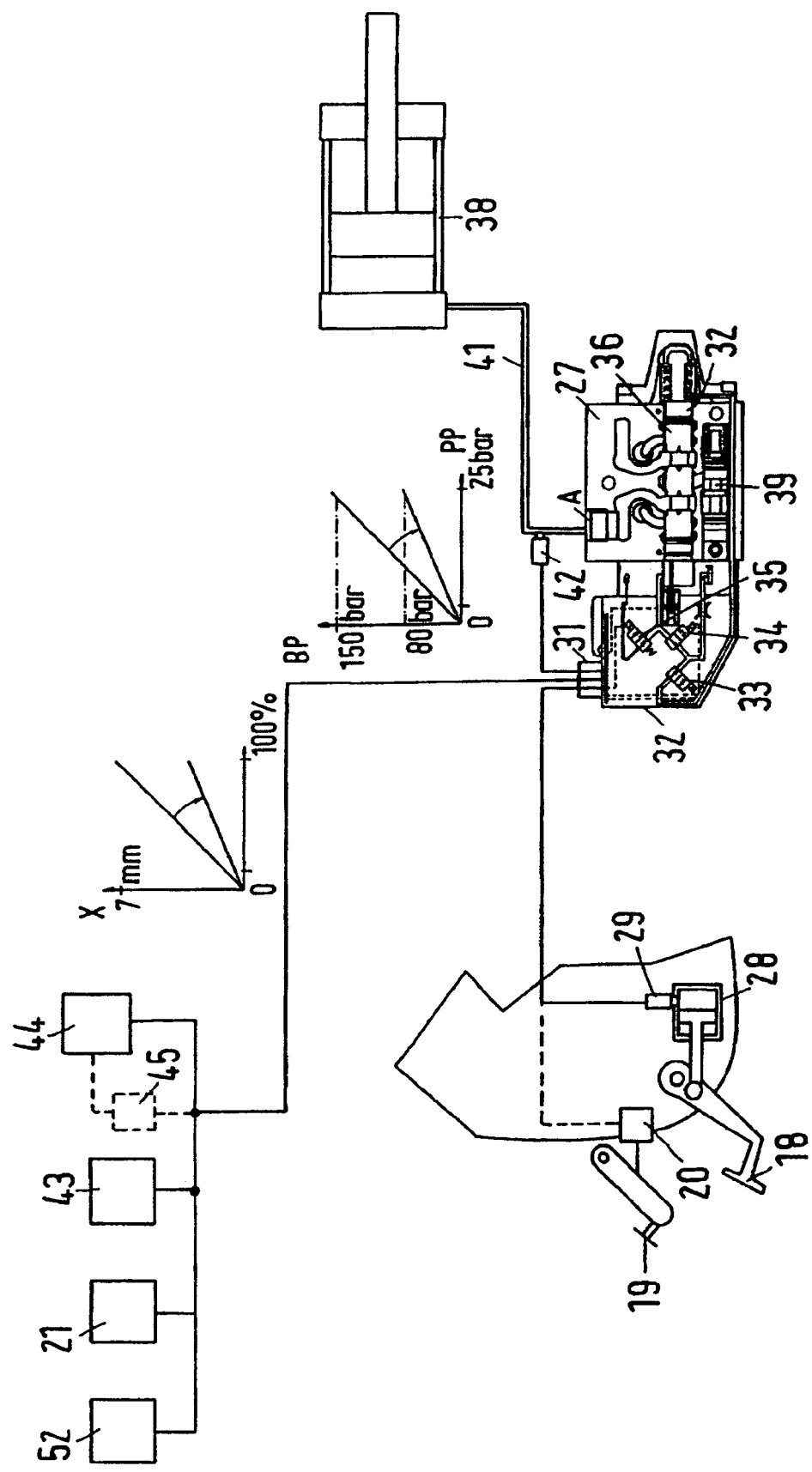
FIG. 4 is a second embodiment of a brake valve arrangement.

FIG. 4 shows a modified embodiment in which same parts have same reference numbers. However, some additional features have been added, which will be explained in the following.

Firstly, in the pipe 41 between the outlet A of the brake valve 27 and the brake cylinder 38 a brake pressure sensor 42 is provided, which is connected with the control device 31. By means of the brake pressure sensor 42, the pressure in the wheel brake cylinder 38 can be controlled in dependence of the pressure in the brake cylinder 28. Thus, the brake pressure sensor 42 permits a feedback.

The sensor 20 at the speed control pedal 19 could also be connected with the control device 31. In stead of the speed control pedal 19, of course also a hand lever can be used. The sensor 20 determines a situation, in which the advance of the pulling vehicle 1 shall be reduced. Such a situation can, for example, be recognised in that the driver takes his foot away from the accelerator. When the trailer 2 has a substantially larger mass than the vehicle 1, it can be expedient to activate the brake of the trailer in this situation. Accordingly, if desired, already the sensor 20 activates the brake function of the trailer 2.

The "transmission ratio" between the brake pedal 18 and the wheel brake cylinder 38 can also be changed via the sensor 21, which determines the load of the engine 14.

When the engine 14 is heavily loaded, this suggests a large mass of the trailer 2. Accordingly, the brake pressure in the wheel brake cylinder 38 must be set to a higher value during braking.

A further sensor 43 is made as pulling force sensor and located in the trailer coupling 23. The larger the mass of the trailer 2, the larger the pulling force to be provided by the pulling vehicle 1 during the start. Thus, also the pulling force sensor 43 can be connected with the control device 31, to adjust the correlation between the activation of the brake pedal 18 and the pressure in the wheel brake cylinder 38.

Also in the trailer 2 a sensor can be provided, namely a merely schematically shown load sensor 52, which is also connected with the control device 31. This sensor 52 can, for example, determine the load state of the trailer via a deformation of the trailer elements for spring suspensions.

Finally, there is the opportunity of using a push force sensor 44 in the trailer coupling 23 to control the wheel brake cylinder 38 via the control device 31. This push force sensor 44, which can also be called "overrunning sensor", can be operated in two different ways. Firstly, it can control the wheel brake cylinder 38 so that a predetermined overrunning force of the trailer 2 on the pulling vehicle 1 is not exceeded. In this case, the overrunning sensor 44 in principle imitates a traditional mechanical overrunning brake. When the preset pushing force, with which the trailer 2 acts upon the pulling vehicle 1, is exceeded, the wheel brake cylinder 38 is supplied with pressurised hydraulic fluid until the pushing force has been sufficiently reduced.

In an alternative embodiment, the overrunning sensor is connected with a memory device 45, which again is connected with the control device 31. In connection with each braking of the trailer 2, the overrunning sensor 44 determines the pushing force acting upon the pulling vehicle 1, from which it derives the mass of the trailer 2. At the next braking process, the slide 36 of the brake valve 27 is actuated in dependence of the previously determined mass, thus controlling the pressure in the wheel brake cylinder 38. Also during an acceleration process a value for the trailer load could be determined and stored, which value could then be used for the next braking process.

It is particularly advantageous that the brake valve 27 can be adapted to different tasks simply by replacing the slide 36. This is explained by way of example in the FIGS. 5 and 6. In both Figs. the brake pressure BP at the outlet A of the brake valve 27 is shown by the displacement X of the slide 36. Here, this displacement amounts to maximally 7 mm.

In some countries, for example in France, provisions require that a pressure is not available at the outlet A in the neutral position of the slide 36. Of course, this does not only concern the exact neutral position, but also a small area next to the neutral position, which, for example, goes up to a deflection X of 8 mm.

To create this behaviour, a pressure control slide is used, so that a pressure at the outlet A is achieved, which depends on the deflection of the slide 36. When, for example, a design of a brake valve 27 as shown in FIG. 7 is used, a groove 46 on the slide 36 merely has to be made so long that in the neutral position it ensures a connection between the working connection A and the tank connection T.

Figure 7:
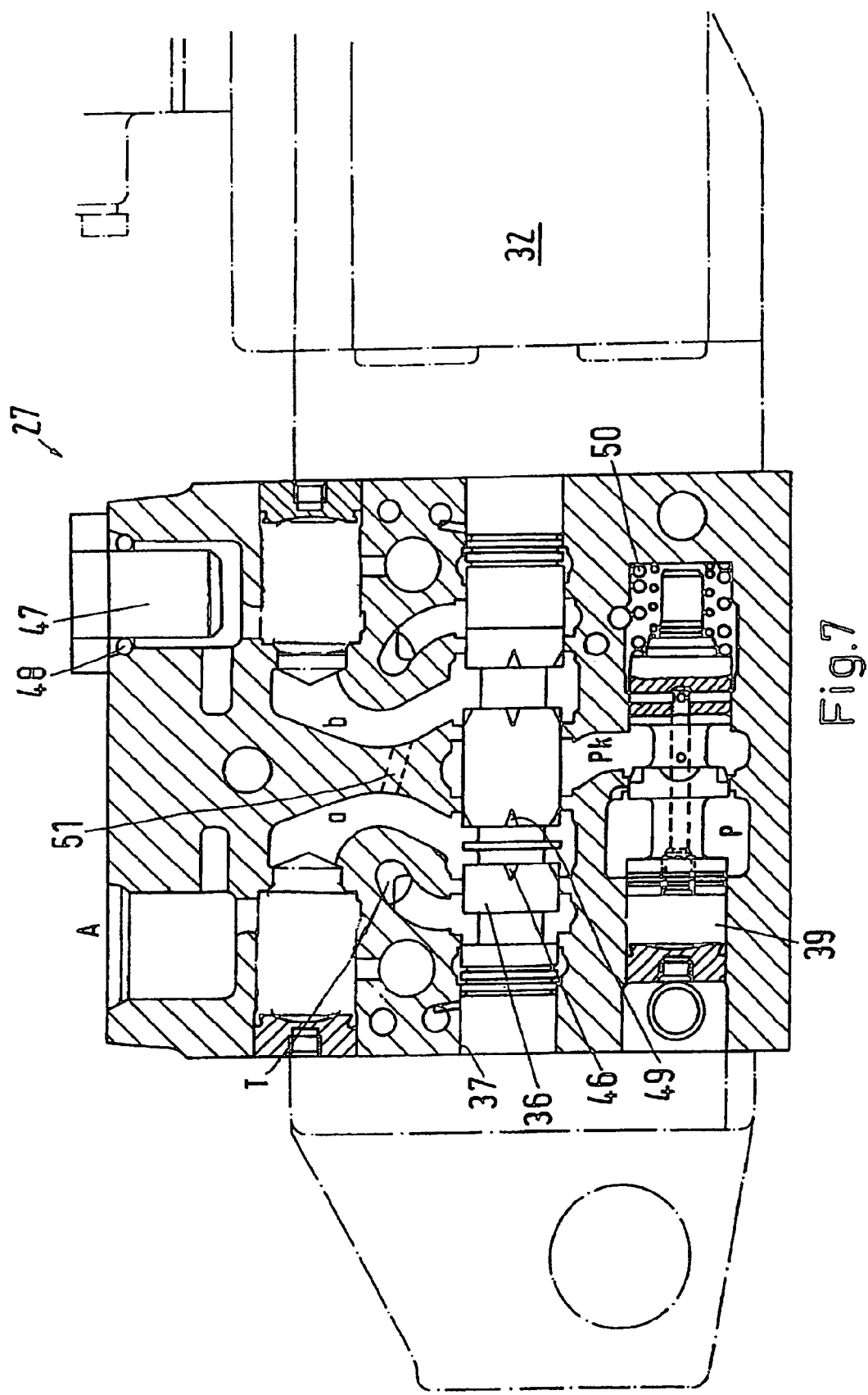
FIG. 7 is a schematic section through a brake valve.

From FIG. 7 it appears that a traditional proportional valve PVG of Sauer-Danfoss ApS, Nordborg, Denmark can be used as brake valve 27. As merely one working connection A is required, the second working connection can be closed by means of a plug 47 with sealing 48 (or in another way). Otherwise, the brake valve 27 corresponds to a valve as described in DE 102 58 517 B3. Reference is explicitly made to this description.

When, as mentioned, the groove 46 has been extended so that in the neutral position it ensures a connection from the working connection A to the tank T, it is achieved that in the neutral position a pressure build-up due to a leakage or something else in the section Pk, that is, a section between the compensation slide 39 and the control slide 36, cannot take place. The groove 46 then has to be adapted so that it closes at approximately the stated 0.8 mm, the opening groove 49 then being extended, until an overflow valve (not shown in detail) located in the brake valve 27 opens at the stated limit of approximately 150 bar.

In other countries the provisions require that in the neutral position, that is, for example, between 0 and 0.8 mm deflection of the control slide 36, a pressure between 8 and 18 bar rules. Only when this pressure is available, the brakes in the trailer 2 are released. This is explained in, for example, DE 198 55 679 A1. Such provisions are, for example, valid in Italy. When the pressure drops below this minimum pressure, the trailer must be braked again.

With such an embodiment, the brake valve 27 can be used with a slight modification. Also here, the control slide 36 is made as a pressure control slide. In this case, however, a connection between the connection A and the pump connection P is required. For this purpose, for example, a groove 49 on the control slide 36 is made to be so long that such a connection occurs in the neutral position. When, at the same time, an adapted spring 50 is used in connection with the compensation slide 39, the pressure in the neutral position of the control slide 36 can, for example, be set at 12 bar. Or rather, the compensation slide itself controls this value.

When, in such an embodiment, it is desired to realise a "handbrake" function, this is also possible in a simple manner. In this case, it must merely be possible to actuate the control slide 36 in the opposite direction. With this opposite activation direction, a connection between the outlet A and the Tank T can be established. Additional components are not required. When a signal is received from the handbrake (or another locking and holding brake), the electrical signal is passed on to the control device 31 of the brake valve 27, which then deflects the control slide 36 in FIG. 7 to the left. However, in this embodiment it is required that the control pressure generation device 32 has four solenoid valves, to enable deflection of the control slide 36 in both directions. To provide a relief to the tank T in this case, an auxiliary channel 51, shown with dotted lines, may be provided.

The dimensions of the brake valve 27 can be adapted to those of other proportional valves, for example the valves PVG of Sauer-Danfoss ApS, Nordborg, Denmark, so that flanging the brake valve 27 onto the valve block 10 will cause no protruding elements.

As in most cases only one working connection A is required, because the brakes are spring-loaded, it is possible to make a housing so that only one working connection A is provided. Of course, it is also possible to use a housing with two working connections, blocking one of these connections.

As the actuation of the control slide 36 is only required in one direction, three solenoid valves 33 to 35 will be sufficient in the control pressure generation device 32.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A brake valve arrangement of a vehicle having a trailer coupling and at least one controllable hydraulic consumer, the brake valve arrangement comprising a valve block having at least two valve modules, wherein at least one valve module controls the at least one controllable hydraulic consumer and at least one other valve module controls a wheel brake cylinder.

2. The brake valve arrangement according to claim 1, wherein the at least one other valve module controlling the wheel brake cylinder is a brake valve.

3. The brake valve arrangement according to claim 2, wherein the brake valve is controlled by an electrical signal.

4. The brake valve arrangement according to claim 3, wherein the electrical signal can be generated by a pressure sensor, which is coupled with a hydraulic brake system of the vehicle.

5. The brake valve arrangement according to claim 4, wherein a trailer brake pressure sensor is located at an outlet (A) of the brake valve.

6. The brake valve arrangement according to claim 3, wherein the electrical signal is generated by an advance working control device.

7. The brake valve arrangement according to claim 3, wherein the electrical signal is generated by an overrunning sensor.

8. The brake valve arrangement according to claim 3, wherein the electrical signal is changed by an auxiliary device.

9. The brake valve arrangement according to claim 8, wherein the auxiliary device has at least one of the following elements:
a manual setting device;
a trailer load sensor;
a pull load sensor;
an engine load sensor;
an overrunning sensor.

10. The brake valve arrangement according to claim 9, wherein the overrunning sensor is connected with a memory device.

11. The brake valve arrangement according to claim 3, wherein the brake valve has a valve actuator with a control pressure generation device, which comprises at least two solenoid valves.

12. The brake valve arrangement according to claim 2, wherein the brake valve has a valve actuator with a control pressure generation device, which comprises three solenoid valves.

13. The brake valve arrangement according to claim 2, wherein the brake valve has a control slide, which is connected in series with a compensation slide.

14. The brake valve arrangement according to claim 2, wherein a control slide can be deflected in two opposite directions, in a neutral position generating a pressure in the range from 8 to 18 bar at an outlet (A) of the brake valve.

15. The brake valve arrangement according to claim 2, wherein at a neutral position of a control slide, a connection exists from an outlet connection (A) of the brake valve to a tank connection (T).

16. The brake valve arrangement according to claim 2, wherein the brake valve is flanged onto the at least one value module controlling the at least one controllable hydraulic consumer.

17. The brake valve arrangement according to claim 1, wherein the at least two valve modules are detachable.

18. A brake valve arrangement of a vehicle having a trailer coupling and at least one controllable hydraulic consumer, the brake valve arrangement comprising a valve block having at least two valve modules, wherein at least one valve module controls the at least one controllable hydraulic consumer and at least one other valve module controls a wheel brake cylinder, wherein the at least one other valve module controlling the wheel brake cylinder is controlled by an electrical signal, wherein the electrical signal can be generated by a pressure sensor, which is coupled with a hydraulic brake system of the vehicle.

19. A brake valve arrangement of a vehicle having at least one controllable hydraulic consumer and a trailer coupling hydraulically connected to a wheel brake cylinder, the brake valve arrangement comprising a valve block having at least two valve modules, wherein at least one valve module is a control valve controlling the at least one controllable hydraulic consumer and at least one other valve module is a brake valve controlling the wheel brake cylinder via the trailer coupling.

* * * * *